June 4, 1935. S. F. ARBUCKLE 2,003,797
HEADLAMP TESTING DEVICE
Original Filed Oct. 23, 1929  3 Sheets-Sheet 2
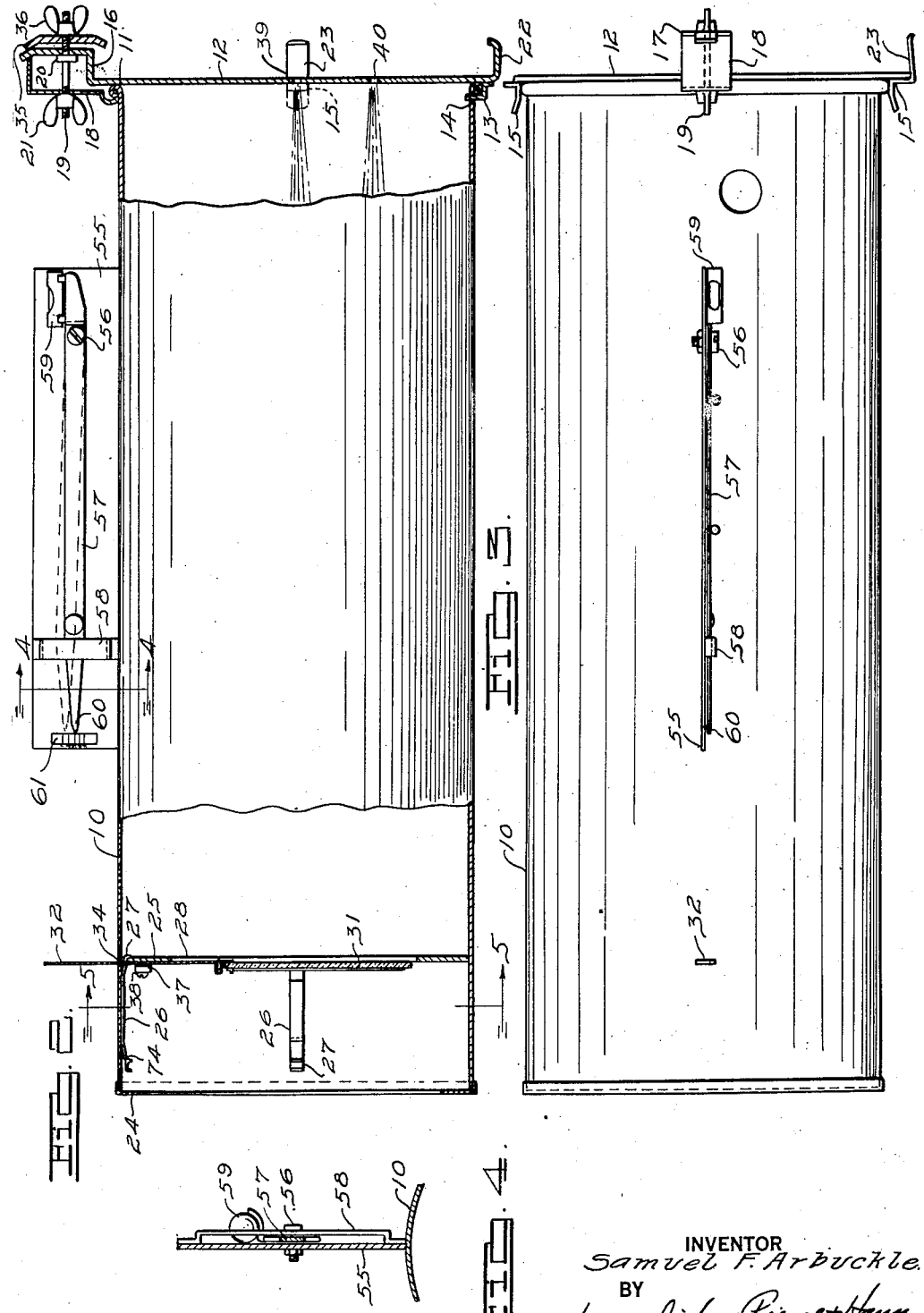
INVENTOR
Samuel F. Arbuckle.
BY
ATTORNEYS.

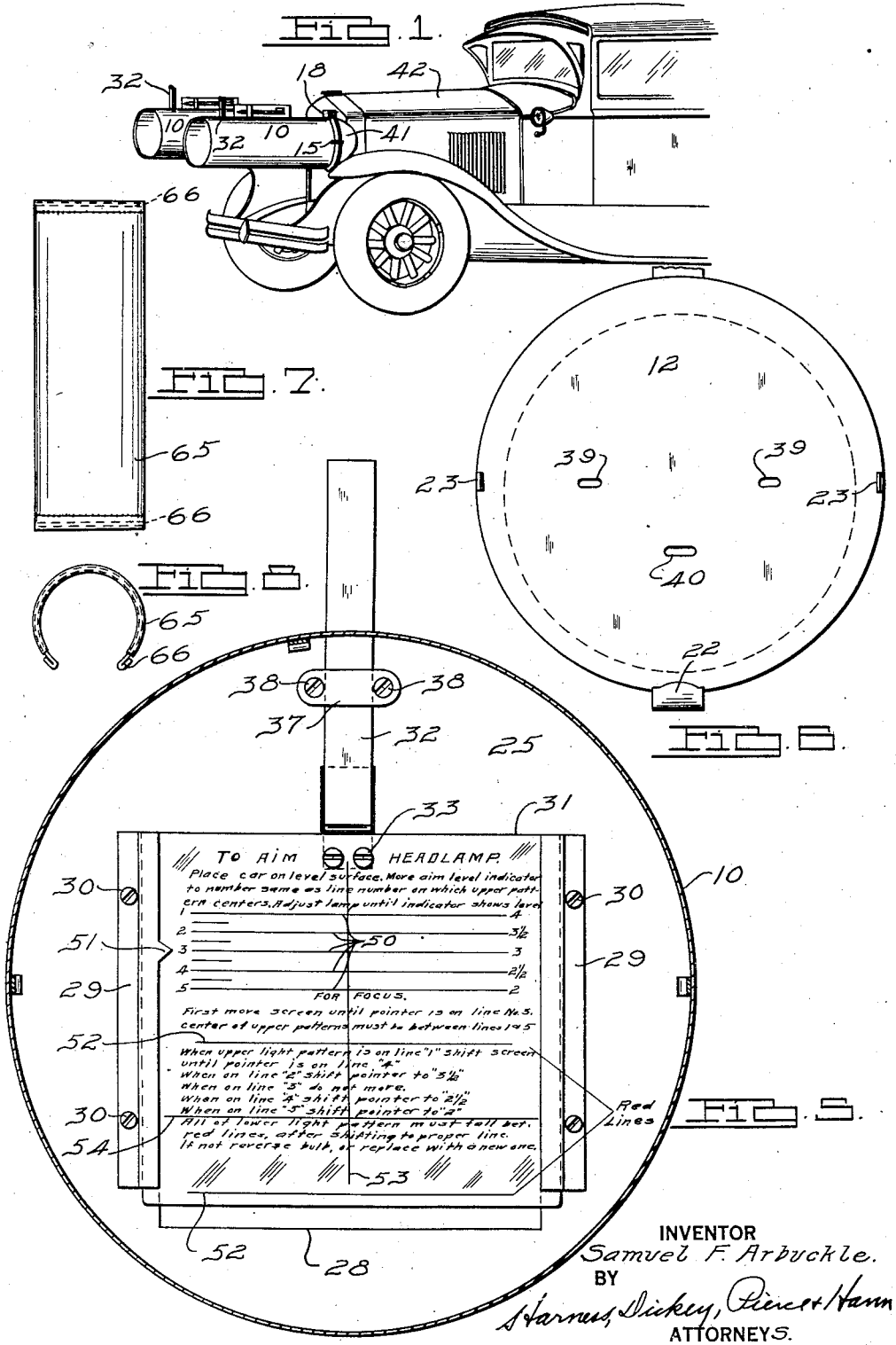

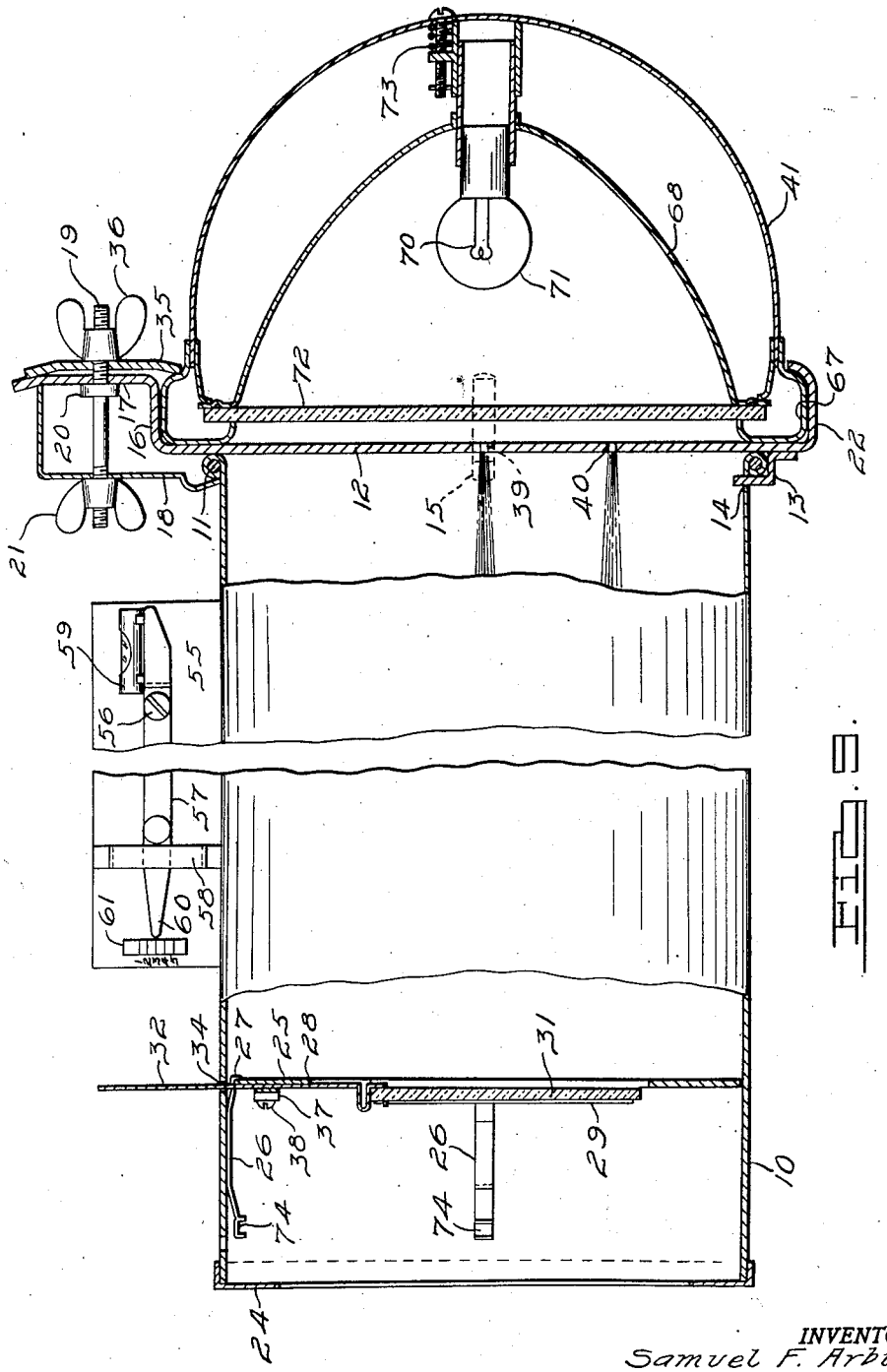

Patented June 4, 1935

2,003,797

UNITED STATES PATENT OFFICE

2,003,797

HEADLAMP TESTING DEVICE

Samuel F. Arbuckle, Highland Park, Mich., assignor, by mesne assignments, to Guide Lamp Corporation, Anderson, Ind., a corporation of Delaware Application October 23, 1929, Serial No. 401,949
Renewed April 20, 1934

14 Claims. (Cl. 88—14)

This invention relates to means for testing the headlamps of motor or other vehicles, the principal object being the provision of a simple and efficient device by the use of which a headlamp may be tested to determine the relative relation of the bulb filament with respect to the focal point of the reflector, and further by the use of which the headlamp may be correctly aimed in a vertical plane.

Another object is to provide a device of the type described that may be employed equally well in daylight or in darkness.

Another object is to provide a device of the type described which may be employed for testing a vehicle headlamp without removing such headlamp from the vehicle.

Another object is to provide a device of the type described particularly adapted for testing head lamps equipped with so-called fixed bulbs, that is, those headlamps in which no provision is provided for adjusting the bulb to vary the relation of the filament relative to the focal point of the reflector.

Another object is to provide a device of the type described including a readily removable supporting member which may be easily and quickly replaced to permit the device to be employed in connection with headlamps of different diameters and designs.

Another object is to provide a device of the type described comprising a plate apertured to permit the passage therethrough of a portion of the rays of light from a headlamp, and a co-operating screen spaced from the headlamp for recording the image of the light rays passing through the apertures in the plate, the screen being shiftable between predetermined limits, and indicia being provided permitting determination of the amount of such shifting, whereby the correctness of the relation of the filament location of the lamp bulb to the focal point of the reflector may be gauged.

A further object is to provide in the device as above described a level mechanism provided with suitable indicia so correlated with the indicia on the shiftable screen as to permit its use for testing the correctness of the height of the beam of light from the headlamp relative to the road.

The above being among the objects of the present invention, same consists in certain novel features of construction and combinations of parts to be hereinafter described with reference to the accompanying drawings, and then claimed, having the above and other objects in view.

In the accompanying drawings, which illustrate the suitable embodiment of the present invention, and in which like numerals refer to like parts throughout the several different views, Fig. 1 is a fragmentary perspective view showing a pair of devices constructed in accordance with the present invention mounted upon the headlamps of a motor vehicle.

Fig. 2 is an enlarged partially broken side elevation of my device, certain parts thereof being shown in vertical section taken through the axis of the device.

Fig. 3 is a plan view of Fig. 2.

Fig. 4 is a fragmentary vertical section taken on the line 4—4 of Fig. 2.

Fig. 5 is an enlarged sectional view taken on the lines 5—5 of Fig. 2.

Fig. 6 is an end view of the device taken from the right as viewed in Fig. 2.

Fig. 7 is a plan view of the hood which it is is preferable to use in connection with the device in testing the lamps in daylight.

Fig. 8 is an end view of the hood shown in Fig. 7.

Fig. 9 is an enlarged partially broken side view of my device shown attached to a headlamp, the headlamp being shown in vertical section.

The present invention relates to an improvement of the Apparatus for determining focal position of lamps covered by my United States Patent No. 1,706,095, issued March 19, 1929, and the lamp focusing apparatus covered by United States Patent No. 1,706,096, issued March 19, 1929 to myself and Carl P. Brockway. The device disclosed in the above identified patent related solely to an apparatus for checking or testing the focus of lamp bulbs in headlamps and no means were provided permitting the lamp to be aimed. While the device in the present invention is similar in operation and construction in many of its points to that of the patented construction, certain modifications and additions have been made whereby a greatly improved device is provided capable of performing additional functions.

Referring to the drawings, the device is shown as comprising a main cylindrical body portion 10 preferably formed of sheet metal. The rear open end of the body portion 10 is provided with an outwardly beaded edge 11 and is normally closed by a plate member 12. The plate member 12 at its lower end is provided with a hook-like member 13 rigidly secured thereto which fits over the beaded edge 11 and whose end is inserted through an opening 14 in the main body portion 10 in order to properly locate the plate with relation to the body at this point. Bent sheet metal strips 15 are provided on the sides of the plate and contact with the sides of the bead 11 to locate the plate 12 laterally of the body 10. The upper end of the plate is provided with an extending portion outwardly bent as at 16 and then upwardly bent as at 17, the portion 16 serving as an abutment for the plate at the upper edge of the rim of the lamp to be tested. An angular shaped clamping member 18 co-operates between the portion 17 and the bead 11 to draw the upper edge of the plate 12 into contact with the body 10 and to retain it in proper relation with respect thereto, a screw 19 threaded into the portion 17 and locked in place with a nut 20 co-operating with the wing nut 21 to effect this clamping operation. The lower end of the plate 12 is provided with an upwardly opening hook-like portion 22 for engagement with the bottom edge of the lamp rim, and each strip metal member 15 is provided with a rearwardly extending portion 23, which portions are adapted to embrace the sides of the lamp rim and thus accurately locate the plate 12 laterally thereof.

The forward open end of the main body 10 is preferably provided with an inturned flange member 24 and rearwardly spaced from the flange member 24 is a plate 25 extending perpendicularly to the axis of the body 10. The plate 25 is held in place by a plurality of spring members 26 secured to the inner wall of the main body 10 and each of which is provided at its inner end with a hook-like portion 27 within which the edges of the plate 25 are received and retained.

The plate 25 is provided therein with a square opening 28. At each side of the opening 28 a guide member 29 is secured to the plate 25 by screws 30 or other suitable means, and between the guide members 29 and the forward face of the plate 25 a screen 31 of ground glass or other suitable translucent material is vertically slidably but frictionally retained. An adjusting member 32, preferably formed of sheet metal, is secured at its lower end to the screen 31 by means of screws 33 or other suitable means and extends vertically up through the opening 34 in the upper wall of the body 10 so that the vertical position of the screen 31 may be controlled by grasping the member 32 exteriorly of the body 10 and moving it upwardly or downwardly. A guide such as 37 is preferably provided on the plate 25 for the member 32, it being secured in position by screws 38 or other suitable means.

In applying the device to the headlamp such as 41 of a vehicle such as 42 (see Figs. 1 and 9), the device is first positioned with its axis extending downwardly and forwardly with respect to the lamp 12, the hooked portion 22 of the rear plate 12 is slipped under the lower edge of the lamp rim 67, the device is then raised at its forward end until the side strips 23 embrace the sides of the lamp rim 67 and the bent portion 16 at the upper end of the plate 12 passes over and rests upon the upper edge of the lamp rim. A clamping member 35 is then slipped over the rear end of the stud 19, its lower end engaging the rear edge of the lamp rim, and a wing nut 36 threaded on the stud then engages the clamp 35 to cause it to bring the upper portion of the plate 12 into firm contact with the face of the lamp rim as indicated best in Fig. 9.

The construction of the device so far described is such that when the rear plate 12 is secured to the main body 10 and also secured to the rim of the headlamp, and assuming that the rim of the headlamp is in a predetermined relative position with respect to the reflector of the headlamp, as must be assumed in this case and which under substantially all conditions is sufficiently correct for practical purposes, the axis of the main body portion 10 is supported in alignment with the focal point of the headlamp reflector 68, and this fact will be assumed through the following description and explanation.

The rear plate 12 is provided with a pair of elongated slit-like openings 39 equally disposed on either side of the axis of the body 10 and each with its major axis in a horizontal plane including the axial line of the main body 10. It is also provided with an elongated slit-like opening 40 positioned below the axis of the main body 10 and with its minor axis in a vertical plane including the axial line of the main body 10. Thus when the device is applied to the headlamp 41 of a motor vehicle 42, as illustrated in Figs. 1 and 9, and the filament 70 of the lamp bulb 71 is energized, the rays of light from the filament 70 upon being reflected by the reflector 68 within the headlamp 41 will be projected through the slits 39 and 40 and will form upon the screen 31 images which may be more or less modified by the lens 72 of the lamp 41. These images or light patterns will be clearly outlined on the screen 31 so that by observing such patterns through the front of the device their relative locations on the screen may be readily determined.

It will be obvious to those skilled in the art that when the filament 70 of the lamp bulb 71 is located at or substantially at the focal point of the reflector 68 the images cast on the screen by the light passing through the slits 39 and 40 will have a well defined location upon the screen 31, and further that if the filament 70 is not in the proper location relative to the focal point of the reflector the images cast on the screen will be correspondingly changed from the definite location above described. Advantage of this fact is taken to permit checking of the position of the filament 70 relative to the reflector 68 in much the same manner as described in the patented construction above referred to. In the present invention the accuracy of the filament location vertically with respect to the reflector 68 is determined by means of a plurality of lines such as 50 which are laid out in horizontal relation on the screen 31. These lines are indicated in Fig. 5 and each is provided with a numerical indication. The left hand guide member is provided with a fixed pointer 51 co-operating with the lines 50. The numerical indications for the lines 50 are of course arbitrary but when once established must be maintained thereafter for any particular instrument in order to permit its continued correct and ready use. It will also be obvious that the number and the spacings of the lines employed may be determined to a greater or lesser extent by experience.

In operation the screen 31 is first moved through the medium of the member 32 to bring a predetermined one of the lines 50 into alignment with the pointer 51, this being the position determined in which the major axes of the patterns of light projected through the slits 39, when the filament is in proper vertical relation with respect to the focal point of the reflector 68 will coincide with the line aligned with the pointer 51. In practice the upper and lower of the lines 50 are so spaced that the screen is placed in theoretically correct position the permissible vertical variation (normally six one-hundredths of an inch) of the filament with respect to the reflector will maintain the major axes of the light patterns through the slits 39 between the upper and lower lines 51. If the major axes of the light patterns through the slits 39 do not fall between the upper and lower lines 50 when the screen 31 is located as described, then it is apparent to the observer that it will be impossible to obtain a correct illumination by the headlamp unless the position of the filament is changed. Where adjusting means for the lamp bulb is provided permitting vertical adjustment of the filament such adjustment may be made to bring the filament to within its permissible limits with respect to the focal point of the reflector, and where no such adjustments are provided and the bulb may be reversed in an attempt to correct the inaccuracy, and if this fails to correct the location of the light pattern it is then obvious to the observer that the bulb must be replaced by one in which the filament is more correctly located.

If the filament is laterally offset from its correct focal position this fact will be apparent to the observer by reason of the fact that in such case the patterns of light through the slits 39 will be shifted laterally of the screen 31 and will assume an unbalanced relation thereon relative to the line 53, which represents the vertical centerline of the screen.

The accuracy of the focus of the lamp, which, of course, depends upon the location of the filament 70 axially of the reflector 68 with respect to the focal point of the reflector 68, is made apparent by the vertical location of the pattern of light cast on the screen through the slit 40 with respect to the theoretically correct location which may be readily determined for each device. To make use of this fact the screen 31 is provided with a horizontal line 54 corresponding with the major axis of the light pattern through the slit 40 when the filament 70 is in theoretically correct focus and the light patterns through the slits 39 center on the central line of the lines 50. Above and below the line 54 lines 52 are located on the screen 31. The lines 52 are so spaced from the line 54 that when the filament 70 is within six one-hundredths of an inch from the focal point of the reflector 68 axially of the reflector, the pattern of light through the slit 40 cast on the screen 31 will fall between the lines 52. If such pattern extends above the upper line 52 or below the lower line 52 it is an indication that the filament 70 is more than six one-hundredths of an inch out of correct position axially of the reflector. Where the headlamp is equipped with an adjusting means such as the screw 73 to vary the position of the bulb axially of the reflector such adjustment may be readily made to bring the filament into its correct position, but if no such adjustment is provided and the light pattern shows the filament out of focus more than the permissible amount, then the bulb must be replaced. The relation of the lower pattern on the screen 31 through the slit 40 will of course have a definite relationship with respect to the major axes of the patterns cast on the screen through the slits 39, and accordingly proper instructions must be provided to permit this relative location to be determined. Such instructions are preferably indicated directly upon the screen as indicated in Fig. 2 between the lines 52.

The operation of the device thus far described is as follows: Assuming that the device has been secured in proper place upon the headlamp of the vehicle, the screen 31 is first shifted to a definite location with respect to the pointer 51, this location in the case of the particular device shown being such that line No. 3 on the left hand side of the screen is brought into alignment with the pointer 51. If the filament is correctly located vertically with respect to the focal point of the reflector, that is located within permissible limits of variation from the theoretically correct location, the center or major axes of the patterns of light cast on the screen 31 through the slits 39 will fall between the lines 1 to 5 as numbered on the left-hand side of the screen. Assuming that this happens to be the case, which therefore indicates that the filament is sufficiently correctly located vertically with respect to the focal point of the reflector then the next step is to determine the correctness of the location of the filament with respect to the focal point of the reflector axially of the reflector. To accomplish this the number of the line on the left-hand side of the screen with which the major axes of the upper light patterns more nearly coincides is noted, and then the member 32 is grasped by the fingers of the operator and is moved until a predetermined line 50 as numbered at the right hand side of the screen 31 is brought into alignment with the pointer 51. If the position of the filament 70 axially of the reflector 68 is within a predetermined distance of the focal point of the reflector, the pattern of light cast on the screen 31 through the slit 40 will then be disposed between the lines 52. In either of the above cases if the required condition is not met by the light pattern it will be obvious that the lamp bulb must be so adjusted as to bring the patterns within their limits of permissible variation, or else the bulb must be replaced.

Assuming that the filament in the bulb is correctly located or has been adjusted to bring it within the permissible limits of variation from the focal point of the reflector, the headlamp itself may then be adjusted to insure the light pattern from the lamp being projected at the correct angle with respect to the vehicle so that the height of the beam of light from the headlamp at a predetermined distance in advance of the vehicle will be within predetermined limits.

The mechanism provided for this purpose employs a principle substantially the same as that disclosed in my United States Patent No. 1,707,593, issued April 2, 1929, and its construction is as follows: Secured to the top of the main body 10 I provide a supporting member 55, preferably of sheet metal, disposed in a vertical plane. Pivoted adjacent the rear end to the support 55 by means of a screw 56 or other suitable means is an arm 57 adapted to swing in a vertical plane. A guide such as 58 is preferably provided for the outer or forward end of the arm 57. Supported on the rear end of the arm 57 is a conventional bubble level 59. The forward end of the arm 57 is provided with a pointer 60 and the support 55 is provided with indicia 61 across which the pointer 60 may sweep. The arm 57 is maintained against free movement by friction, which may be supplied in any suitable manner. The indicia 61 are arranged in a predetermined relation—determined experimentally or otherwise—with respect to the lines 50 on the left hand side of the screen 31, this relation being such that when the major axes of the patterns of light through the slits 39 fall on, or approximately on one of the lines 50 when the screen 31 is in its initial position, and the pointer 60 is moved to a line of the indicia 61 corresponding with such line on the screen 31, the level 59 will indicate a level condition thereof when the beam of light from the headlamp is projected at the proper angle with respect to a level surface upon which the vehicle 42 is then resting. If in such a case the level 59 does not indicate a level condition thereof then the headlamp 41 may be adjusted so as to bring the level 59 to indicate a level condition, and in such a case the beam of light from the headlamp 41 will be projected from the headlamp at a predetermined height above the ground at a predetermined distance in front of the vehicle.

With this device it will thus be apparent that not only may the location of the bulb filament with respect to the focal point of the headlamp reflector be easily and accurately determined, but when once established as being within the permissible limits of variation from the theoretically correct location, the headlamp itself may be adjusted for vertical direction of beam in a quick and efficient manner without the necessity of actually testing the lamp out under actual conditions of service.

In order to permit the use of this device in daylight, a hood may be provided for excluding the light from between the operator's eyes and the screen 31. This hood may take the form illustrated in Figs. 7 and 8 in which it is shown as comprising a nearly circular fabric hood 65, each end of which is provided with a correspondingly shaped resilient wire member 66 inserted therein, the diameter of the wire members 66 being such that one of them may be inserted in the forward end of the device and be received in the hooks 74 formed at the forward end of the spring members 26, and the hood member may then be pulled out to permit the operator to look through the hood in much the same manner as the hoods employed by photographers. When not in use the hood may be folded back over the outside of the device and the opposite wire end member 66 may be sprung over the body 10 to hold it in this position.

Each rear supporting plate 12 is preferably designed to fit one size of headlamp rim of a particular design of headlamp, and in order to permit the use of the device for various sized headlamps without necessitating an entirely different device for each size, it will be apparent that the rear plates 12 may be formed in various sizes each such that it may be secured to a single main body 10. In this manner a single main body 10 and the parts carried thereby may be employed for testing any size headlamp by providing a suitable number of different sized supporting plates 12.

While I have described the above device as being particularly provided for the testing of headlamps on automobiles it will be apparent that it may be employed for a much wider range of uses. In fact it may be readily employed as a laboratory instrument or an inspection instrument for testing the accuracy of lenses, reflectors, or bulbs. In such a case it may not be necessary that the main body portion 10 be formed to exclude light as in the drawings.

For instance, in testing the accuracy of the location of a lamp bulb filament with respect to the base or shank of the bulb, this device may be used in connection with a known accurate reflector having a known accurate lamp socket and a known accurate lens. In such a case the lines 50 on the screen 31 may be so arranged in number and spacing as to permit accurate measurement of the distance of the filament from the focal point of the reflector in decimal parts of an inch in order to measure the exact amount which the filament varies from its theoretically true position vertically. Likewise, a plurality of lines 53 may be shown on the screen 31 and so arranged in number and spacing as to indicate in decimal parts of an inch the distance which the filament is out from its theoretically correct position transversely. In a similar manner a plurality of lines 52—54 may be provided and so arranged in number and spacing as to indicate in decimal parts of an inch the amount which the filament is out from its theoretically true position axially of the reflector. In such a case, inasmuch as the reflector and its socket are of known accuracy, the relation of the filament to the shank of the bulb may be thus accurately measured in decimal parts of an inch. By this means a ready and accurate inspection of the lamp bulbs may be effected.

In the testing of the reflectors by this device a lamp bulb may be provided with its filament located at the theoretically correct focal point for a correctly designed and located reflector, and by inserting the reflectors in place the relative position of the patterns of light on the screen 31 will indicate the direction and the amount which the actual focal point of the reflector varies from that which it theoretically should assume.

In the testing of lenses a known accurate reflector with a known accurate bulb may be employed, in which case the pattern of light as varied by the lens will indicate the correctness of the angle of the reflecting surfaces on the lens through which the light passes, and in this manner the accuracy of such reflecting surfaces may be determined. Such modifications of the design as will be necessitated by such modifications in the use of the device will be apparent to those skilled in the art and a description of the same is not deemed necessary here.

Formal changes may be made in the specific embodiment of the invention described without departing from the spirit and substance of the broad invention, the scope of which is commensurate with the appended claims.

What I claim is:

1. A device for testing a headlamp having a reflector and a light source mounted therein including, in combination, a supporting member, a plate mounted in one end of said member, a screen in said member axially spaced from said plate, means for securing said plate and screen in predetermined relation with respect to said reflector, said plate having an aperture therein through which a pattern of light may be projected from said reflector upon said screen, and calibrations on said screen for determining the relative location of said light source with respect to said reflector by the location of said light pattern on said screen, said screen being shiftable in the plane thereof whereby to enable the location of said light pattern to be corrected with respect to said calibrations.

2. In a device of the type described, in combination with a reflector and a light source therein, a plate, means for supporting said plate in front of said reflector and securing it in a predetermined relation with respect thereto, a vertically shiftable screen, means for supporting said screen in substantially parallel relation with respect to said plate and in spaced relation thereto forwardly of said reflector, said plate having an aperture therein laterally of the axial line of said reflector, said plate having another aperture therein vertically spaced from the axis of said reflector, and cooperating calibrations on said screen for determining the accuracy of the light pattern, cast thereon through said apertures.

3. In a device of the type described, in combination with a reflector and a light source therein, a plate, means for locating said plate in front of the face of said reflector and in a predetermined relation with respect thereto, a vertically shiftable screen, means for supporting said screen in substantially parallel relation with respect to said plate and in spaced relation thereto forwardly of said reflector, said plate having a pair of apertures therein angularly spaced from each other, in respect to the axial line of said reflector, approximately ninety degrees, and calibrations on said screen for determining by the pattern of light cast thereon through one of said apertures the relative accuracy of said light source relative to said reflector in one direction, and other calibrations bearing a predetermined relation with respect to the first mentioned calibrations for determining by the pattern of light cast thereon through the other of said apertures the relative accuracy of said light source relative to said reflector in another direction.

4. In a device of the type described, in combination with a reflector and a light source therein, an opaque plate, means for fixing said plate in relation to the front of said reflector, said plate having a pair of apertures therein one of which is spaced laterally and the other of which is spaced vertically from the axial line of said reflector, a screen, means for supporting said screen in substantially perpendicular relationship to the axial line of said reflector in advance of said reflector and said plate, calibrations on said screen for determining the relative accuracy of the pattern of light cast thereon from said reflector through one of said apertures, and other calibrations on said screen for determining the relative accuracy of the pattern of light cast thereon from said reflector through the other of said apertures, said screen being shiftable whereby the second mentioned calibrations may be located in a predetermined relation relative to the light pattern cast on said screen through the first mentioned aperture.

5. In a device of the type described, in combination with a reflector and a light source therein, an opaque plate, means for fixing said plate in relation to the front of said reflector, said plate having a pair of apertures therein one of which is spaced laterally and the other of which is spaced vertically from the axial line of said reflector, a shiftable screen, means for supporting said screen in substantially perpendicular relationship to the axial line of said reflector in advance of said reflector and said plate, calibrations on said screen for determining the relative accuracy of the pattern of light cast therein from said reflector through one of said apertures, other calibrations on said screen for determining the relative accuracy of the pattern of light cast thereon from said reflector through the other of said apertures, and means for initially setting said screen relative to the theoretical axial line of said reflector, said screen being shiftable whereby the second mentioned calibrations may be located in a predetermined relation relative to the light pattern cast on said screen through the first mentioned aperture.

6. A device for testing a headlight having a reflector and a light source therein including, in combination, a hollow member, means for supporting said member in advance of said headlight, an opaque plate, means for fixing said plate near one end of said member, said plate having a pair of apertures therein one of which is spaced laterally and the other of which is spaced vertically from the axial line of said reflector, a screen, means for supporting said screen in substantially perpendicular relationship to the axial line of said reflector in said member and in advance of said plate, and indicating lines on said screen for determining, by the relative positions of the patterns of light cast on said screen through said apertures, the relative accuracy in two planes of the location of said light source with respect to the focal point of said reflector.

7. A device for testing a headlight having a reflector and a light source therein including, in combination, a hollow member, an opaque plate, means for fixing said plate near one end of said member, said plate having a pair of apertures therein one of which is spaced laterally and the other of which is spaced vertically from the axial line of said reflector, a screen, means for supporting said screen in substantially perpendicular relationship to the axial line of said reflector in said member and in advance of said plate, means for supporting said member relatively to said reflector, and indicating lines on said screen for determining, by the relative positions of the patterns of light cast on said screen through said apertures, the relative accuracy in three planes perpendicular to each other of the location of said light source with respect to the focal point of said reflector.

8. In a device of the type described, in combination with a headlamp having a reflector and a light source therein, means fixed relative to said reflector limiting the projection of light from said lamp to a plurality of independent beams of relatively small size, a screen, means for supporting said screen in spaced relation to the first mentioned means for indicating the patterns of light projected by said beams, calibrations on said screen, said screen being shiftable to a predetermined position relative to the theoretically correct axial line of said reflector whereby to indicate the relative accuracy of said light source in one direction relative to said reflector by the location of the pattern of light cast on said screen by one of said beams relative to said calibrations, and other calibrations on said screen whereby when said screen has been shifted to compensate for inaccuracies of the location of said light source in the first mentioned direction the relative accuracy of said light source relative to said reflector in another direction may be determined by the relative location of the pattern of light cast on said screen by another of said beams with respect to said other calibrations.

9. A device for testing a headlamp having a reflector and a light source therein including in combination, a body member securable to said headlamp in substantially parallel relation to the axial line of said reflector, a plate fixed relative to said member closing the headlamp end of said member, a shiftable screen adjacent the other end of said member supported thereby, said plate having an aperture therein laterally spaced from said axial line and a second aperture therein vertically spaced from said axial line, calibrations on said screen, means for initially setting said screen in a position to indicate by the light pattern thereon from one of said apertures relative to said calibrations the relative accuracy of the location of said light source in one direction with respect to said reflector, and other calibrations on said screen for determining, upon shifting of said screen in accordance with the relation of the first mentioned light pattern to the first mentioned calibrations, the relative accuracy of said light source in another direction relative to said reflector by the location of the light pattern cast on said screen through the other of said apertures relative to the last mentioned calibrations.

10. In a device of the type described, in combination with a reflector and a source of light therein, a screen in advance of said reflector, means interposed between said screen and reflector limiting illumination of said screen by said source to a plurality of separate and independent light patterns, means for supporting said screen and the first mentioned means in predetermined relation with respect to said reflector, means for initially locating said screen in a predetermined position relative to said reflector, calibrations on said screen for determining the relative location of one of said light patterns thereon, said screen being shiftable whereby the relative location of said light pattern on said screen may be corrected for an inaccuracy in the location of said source relative to said reflector in one direction, and other calibrations on said screen adapted to indicate after such shifting of said screen, by the relative location of another of said light patterns in respect thereto, the relative position of said source in respect to said reflector in another direction.

11. A device for testing a headlamp having a reflector and a source of light therein including, in combination, a body member securable to said headlamp, an apertured plate mounted at the headlamp end of said body member and secured thereto, a screen adjacent the other end of said body member supported thereby and adapted to record thereon the pattern of light projected from said lamp through the aperture in said plate, level indicating mechanism operatively associated with said body portion, said level mechanism being shiftable, and interrelated indicia for said screen and for said level indicating mechanism for co-relating said level indicating mechanism with the initial position of said light pattern on said screen.

12. In a device of the type described, in combination with a headlamp having a reflector and a source of light therein, a body member secured to said headlamp, a screen carried by said body member in advance of said headlamp, means fixed relative to said body member interposed between said screen and said reflector limiting illumination of said screen by said source to a plurality of separate independent light patterns, means for initially locating said screen in respect to said reflector, calibrations on said screen for indicating the position of one of said light patterns thereon, said screen being shiftable to correct the relative position of said light pattern thereon in accordance with the inaccuracies of said source with respect to said reflector in one direction, shiftable level indicating mechanism carried by said body member, and indicia for said screen and for said level indicating mechanism whereby the latter may be shifted in co-relation with the former.

13. A device for testing a headlamp having a reflector and a light source mounted therein including, in combination, a supporting member, a plate mounted in one end of said member, a screen in said member axially spaced from said plate, means for supporting said plate and screen adjacent said reflector and substantially in alinement with the reflector axis so as to receive light therefrom, said plate having an aperture therein through which a pattern of light may be projected from said reflector upon said screen, and calibrations on said screen for determining the relative location of said light source with respect to said reflector by the location of said light pattern on said screen, said screen being shiftable in the plane thereof whereby to enable the location of said light pattern to be corrected with respect to said calibrations.

14. A device for testing a headlamp having a reflector and a light source mounted therein including, in combination, a supporting member, a plate mounted in one end of said member, a screen in said member axially spaced from said plate, means for supporting said plate and screen adjacent said reflector and substantially in alinement with the reflector axis so as to receive light therefrom, said plate having an aperture therein through which a pattern of light may be projected from said reflector upon said screen, and calibrations on said screen for determining the relative location of said light source with respect to said reflector by the location of said light pattern on said screen, said screen being shiftable in the plane thereof whereby to enable the location of said light pattern to be corrected with respect to said calibrations, and a level adjustably carried by said supporting member so as to permit positioning it at a point corresponding to a predetermined aiming of the headlamp so as to provide a gauge in aiming the latter.

SAMUEL F. ARBUCKLE.